F. W. BENTLEY.
EMERGENCY GOVERNOR.
APPLICATION FILED MAR. 30, 1909.
1,049,802. Patented Jan. 7, 1913.
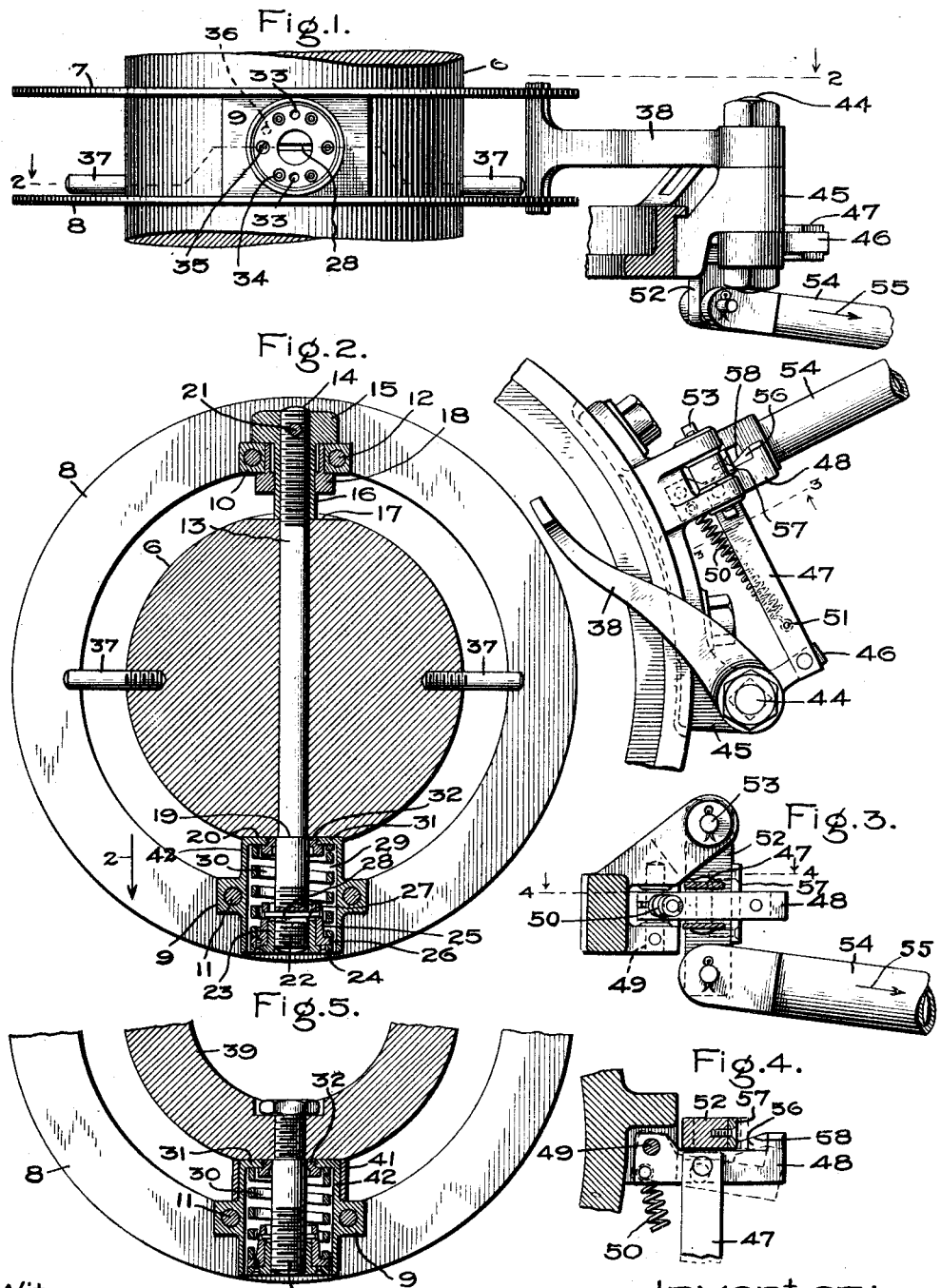
Witnesses:
Herbert Horstman
J. Ellis Glen.
Inventor:
Fred W. Bentley,
by Albert G. Davis
Att'y

UNITED STATES PATENT OFFICE.

FRED W. BENTLEY, OF SCHENECTADY, NEW YORK, ASSIGNOR TO GENERAL ELECTRIC COMPANY, A CORPORATION OF NEW YORK.

EMERGENCY-GOVERNOR.

1,049,802.   Specification of Letters Patent.   Patented Jan. 7, 1913.

Application filed March 30, 1909. Serial No. 486,774.

*To all whom it may concern:*

Be it known that I, FRED W. BENTLEY, a citizen of the United States, residing at Schenectady, county of Schenectady, State of New York, have invented certain new and useful Improvements in Emergency-Governors, of which the following is a specification.

This invention relates to emergency governing devices for steam engines, turbines and other machines, which devices act automatically to interrupt the supply of steam or other motive energy when the speed of rotation of the apparatus exceeds a safe limit, thereby safe-guarding said apparatus against damage or possible destruction and also protecting adjacent objects from injury by flying masses thrown off by centrifugal action should the uncontrolled speed become so great as to burst the rotating members.

The object of the invention is to provide an improved emergency governing device of relatively simple and inexpensive construction which is efficient and certain in operation, adaptable to different machines, readily tested and balanced, and easily adjusted for the desired operating conditions, the adjustment being secure against disturbance by the ordinary handling of the device.

In the accompanying drawing illustrating one of the embodiments of the invention, Figure 1 is a side view of the emergency governing device; Fig. 2 is a section on the line 2—2 of Fig. 1; Fig. 3 is a detail view on line 3—3 of Fig. 2; Fig. 4 is a detail view on the line 4—4 of Fig. 3; and Fig. 5 is a partial sectional view of a slight modification.

The governor is shown as applied to a rotating vertical shaft 6 but it is well adapted for use with horizontal or other shafts arranged at an angle to the vertical. It includes two integral flat annular rings 7, 8 surrounding the shaft and preferably formed from sheet metal. The rings are held in fixed relation to each other by blocks 9, 10 which are fastened to said rings by rivets 11, 12. The governor is made to rotate with the shaft 6 by a bolt 13 passing through said shaft and having its ends or end members located within the blocks 9, 10 but said governor is movable longitudinally of the bolt under certain conditions to be described farther on. The end 14 of the bolt 13 is threaded to receive a nut that has a head 15 engaging the block 10 and a sleeve-like portion 16, the end of which bears against a counterbored surface 17 on the shaft 6. The nuts 15, 16 and the block 10 are preferably made of steel. To prevent any corrosion, that might occur between them if placed in direct contact, from opposing the free sliding movement of the block on the sleeve, a bushing 18 of non-corrosive metal is secured in the opening in the block that receives said sleeve.

The nut 15, 16 draws the shoulder 19 on the bolt 13 against a counterbored surface 20 on the shaft 6 and thus secures the bolt in fixed relation to the shaft. A cotter-pin 21 prevents the nut from unscrewing. The projecting end 22 of the bolt 13 beyond the shoulder 19 is threaded to receive a nut having a sleeve portion 23 and a flange 24. Mounted on the sleeve portion 23 is a sieeve or thimble 25 provided with a flange 26 that engages the inner face of the flange 24. The thimble 25 is also provided with a pin 27, the ends of the pin being secured in the walls of said thimble. The pin 27 passes through a slot 28 in the end 22 of the bolt and thereby prevents the thimble 25 from turning but permits it to be moved longitudinally. The block 9 has a bore 29 in which are located the parts 22, 23, 24, 25, 26 and 27 and also a compression spring 30 that is arranged between the flange 26 and the wall or abutment 31 that closes the inner end of the bore. The wall 31 is furnished with a bushing 32 of non-corrosive metal arranged for sliding engagement with the unthreaded portion of the end 22 of the bolt 13. The tension of the spring 30 may be adjusted by turning the nut 23, 24 to move the thimble 25 in or permit it to move out. To facilitate the turning of the nut to adjust the spring, the flange 24 has two holes 33 to receive a suitable spanner wrench. To secure the nut in adjusted position, its flange is provided with a number of holes 34, say six for example, any one of which may receive a screw 35 which screws into a registering tapped hole in the flange 26. The flange 26 is also provided with another tapped hole 36 into which the screw 35 may be screwed. This hole 36 is preferably located midway between two of the holes 34 so that with six holes in the flange 34 it is possible to turn the nut through fractions of a turn as small as one-twelfth to adjust the spring 30, and then secure the parts in their adjusted relation. Obviously a finer or coarser adjustment may be similarly obtained if desired.

When the shaft is rotating at normal speed the governor assumes the position shown in Fig. 1. To prevent its tipping too far from said position when the shaft is not rotating, the pins 37 are screwed into the shaft adjacent one of the rings 7, 8. The ends of the bolt 13 and their attached parts may be conveniently balanced with respect to the centrifugal forces due to their rotation by varying the mass of the head 15 of the nut, thus promoting steadiness of operation of the shaft which may be running at very high speeds. The combined mass of the rings 7, 8 and blocks 9, 10, is not symmetrically distributed with respect to the axis of the shaft when held in the position shown in Fig. 2 by the action of the spring 30. The lack of symmetry is due to the mass of the block 9 being greater than that of the block 10 although the centers of said masses are at substantially the same distance from the axis of shaft, Fig. 2. Owing to this distribution or arrangement of said mass, the actuating member comprising the rings 7, 8 and blocks 9, 10 tends under centrifugal action to move in the direction of the arrow 2 when the shaft 6 is rotated. The spring 30 located between the flange 26 and the wall 31 opposes this movement. As the speed increases, the centrifugal force of the unbalanced mass tending to move the actuating member increases, and at some predetermined speed, say ten per cent. above normal, said force overcomes the opposing force of the spring and moves the actuating member along the bolt 13 in the direction of the arrow 2 until the bushing 18 strikes against the surface 17. The periphery of the rings 7, 8 which is normally concentric with the shaft 6 then assumes an eccentric position and strikes against the arm or trigger 38 to actuate certain regulating mechanism which shuts off the supply of motive energy to the prime mover or motor that is driving the shaft 6, and thereby prevents further increase of speed and consequent damage to the apparatus. The speed at which the emergency governing device becomes operative may be changed by varying the strength of the spring 30 or the distribution of the mass of the actuating member or by adjusting said spring by means of the nut 23, 24.

In Fig. 5, a modification is shown in which a hollow shaft or an annular member 39 attached to a shaft is used in place of the solid shaft 6. A stud 40 is substituted for the end 22 of the bolt 13 and a suitable bolt may be used in place of the other end of the bolt 13. If it is desired to decrease to a certain extent the excess of speed which will cause a governor having a spring 30 of given tension or strength to become operative by changing the distribution of the mass of the actuating member, this may readily be done by varying the mass of the block 9 by placing a removable ring 41 on the hub or boss 42 of said block. The thickness and hence the mass of this ring may be easily varied to secure operation at the desired speeds.

It is customary to adjust these governing devices on a testing stand where any desired speeds are readily obtained and the action of the device observed. The spring 30 is there adjusted to secure operation at a proper speed and then the adjusting nuts are secured in position by the screw 35. The bolt 13 may then be taken out of the shaft or holder used on the testing stand by removing the nut 15, 16 and the governing device taken from the stand and assembled in the machine to be controlled by it with the assurance that the adjustment cannot be disturbed by this operation. The adjustment can only be changed by removing the screw 35 and turning the nut 23, 24 and there is no occasion for disturbing these parts during the transfer.

The arm 38 is mounted on the upper end of a short shaft 44 mounted in a bracket 45 secured to some fixed part of the apparatus adjacent the rings 7, 8. The lower end of the shaft 44 carries an arm 46 which may be regarded as one arm of a bell-crank lever, the arm 38 forming the other member of the lever. The arm 46 is connected by a link 47 with a latch 48 pivoted at 49 on the bracket 45. A spring 50 is arranged between the heel of the latch 48 beyond the pivot 49 and a point 51 on the link 47 adjacent the arm 46. This spring tends to hold the arm 38 in the position shown in Fig. 2, and to hold the latch 48 in engagement with an arm 52 pivoted at one end on a pin 53 in a lug on the bracket 45. To the lower end of the arm 52 is pivoted a link or rod 54 which leads to any suitable mechanism for shutting off the supply of motive energy to the prime mover or motor which drives shaft 6 and whose speed is to be controlled by the governing device. This link is normally under tension and tends to move in the direction of the arrow 55 but it is held from such movement by the latch 48. The engaging faces of the latch 48 and the arm 52 are provided with hardened steel pieces 56, 57. The pivot 49 of the latch 48 is arranged in line with the engaging face of the piece 56 so that there is no tendency for the pull on the latch to turn it about its pivot and accidentally release the parts. When the arm 38 is turned about the axis of the shaft 44 by the rings 7, 8 striking against it, the latch 48 is drawn away from the arm 52 by the arm 46 and link 47. As soon as the arm 52 is released from the latch 48, said arm is drawn outward by the rod 54 and moves over the inclined or cam surface 58 of the steel piece 56. This engagement of the arm 52 with the face 58 causes the latch 48 to turn about the pivot 49 and by means of the link 47 and arm 46 to draw the arm 38 farther away from the governor and thereby prevent the rings 7, 8 from pounding it during the continued rotation of the shaft as the machine slows down after the governing device has acted to shut off the supply of motive energy. When the speed falls off as just described, the centrifugal force acting on the rings and blocks decreases and at some point this force will be overcome by the spring 30 which will return said parts to the position shown in Fig. 2. When used with turbo-generators feeding a common line, it is often important that the actuating member be returned to normal position before the speed has fallen very much below normal so that the generator can be promptly put in service again. The ring 41 also affords a convenient means for varying the speed at which the actuating member is so returned. Said ring increases the force that is opposed by the spring 30, and to cause the governor to act at the same excess of speed as before, it is necessary to increase the force exerted by said spring by screwing up its adjusting nut. This increased force however also acts to return the governor to its normal position, thereby making it possible to reset the control mechanism at a less speed below normal. During the resetting of the control mechanism, the rod 54 is forced back to the position shown in Fig. 3 carrying the arm 52 with it and the spring 50 throws the latch 48 into engagement with said arm, at the same time returning the arm 38 to normal position.

The bracket 45 may be located at any convenient point about the shaft and the rod 54 may be swung about its pivot to lead in any desired direction. Thus it is possible to arrange the parts to operate motive energy control mechanism in any desired location without changing their structure except perhaps the length of the rod 54, which latter is a very simple change. By the use of three springs of different strength and the removable ring, it has been found possible to adapt this governor to the range of speeds required for a complete commercial line of turbo-generators.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In an emergency governing device, the combination of a rotatable shaft, members projecting radially from the shaft at opposite ends of the same diameter, blocks having different masses that are mounted for sliding movement on said members, two annular rings arranged in planes substantially perpendicular to the axis of the shaft and mounted on opposite faces of the blocks, said rings being normally concentric with the shaft, a nut on one of the projecting members that has an abutment, an abutment on the block that is mounted on the same member, and a spring arranged between the two abutments that opposes the sliding movement of the blocks and rings on said members.

2. In an emergency governing device, the combination of a rotatable shaft, an actuating member comprising two integral flat annular rings normally disposed in concentric relation to the shaft, two blocks having different masses that are arranged between the rings in diametrically opposite relation to each other, and means for securing the rings to the blocks, members projecting from the shaft into said blocks upon which the actuating member is mounted so as to rotate with the shaft and to be movable transversely thereof, a spring arranged in one of the blocks around one of the projecting members and bearing at one end against an abutment on said block, an adjusting nut on the end of said member against which the other end of the spring presses, means for locking the nut against turning, and regulating mechanism controlled by the actuating member.

3. In an emergency governing device, the combination of a rotatable shaft, an actuating member comprising two annular rings normally disposed in concentric relation to the shaft and two blocks having different masses arranged between the rings and secured thereto in diametrically opposite relation to each other, members projecting from the shaft into said blocks on which the actuating member is mounted so as to rotate with the shaft and to be movable transversely thereof, a spring arranged in one of the blocks around one of the projecting members and bearing at one end against an abutment on the block, an adjusting nut on the end of said member against which the other end of the spring presses, there being a cylindrical hub on said block, a removable ring mounted on the hub, and regulating mechanism controlled by the actuating member.

4. In an emergency governing device, the combination of a rotatable shaft, a ring-shaped actuating member provided with a chamber, a bolt secured to the shaft and having an end portion projecting into the chamber, said end having a slot therein, a nut on the outer end of the bolt provided with a flange and a sleeve portion, a thimble mounted on the sleeve portion and having a flange in engagement with the flange on the nut, a pin mounted in the thimble beyond the end of the nut and engaging the slot to prevent said thimble from turning, a spring arranged between the inner wall of the chamber and the flange on the thimble which opposes the movement of the actuating member, and means for locking the nut against turning including a screw which secures the two flanges together.

5. In an emergency governing device, the combination of a rotatable shaft, a bolt or stud passing transversely through the shaft and provided with a shoulder adjacent one end, a nut on the other end of the stud that has a head and a sleeve portion, the latter engaging the shaft and securing the bolt in the shaft by drawing said shoulder against the opposite side of said shaft, a block mounted for sliding movement on the sleeve portion of the nut, a second block having a greater mass which is mounted for sliding movement on the projecting portion of the stud beyond the shoulder, two parallel annular rings mounted on opposite faces of the blocks and surrounding the shaft, a nut on the end of the projecting portion of the stud, an abutment on the second block, a spring arranged between the nut and the abutment which opposes the movement of said rings and blocks along the stud, and means for locking the nut against turning.

6. In an emergency governing device, the combination of a rotatable shaft, an actuating member mounted thereon, a bracket mounted adjacent the member, a bell-crank lever pivoted on the bracket with the outer end of one of its arms adjacent said member, an arm pivoted on the bracket with its pivot arranged in transverse relation to the pivot of the bell-crank, a rod leading from the arm to the regulating mechanism that is normally under tension, a latch which engages the arm and normally holds the rod from moving, a link connecting the second arm of the bell-crank with the latch, and a spring which tends to keep the latch in engagement with the arm.

7. In an emergency governing device, the combination of a rotatable shaft, an actuating member, means carried by the shaft on which said member is mounted to rotate with the shaft and to be movable transversely thereof, a bracket mounted adjacent said member, a bell-crank pivoted on the bracket with the outer end of one of its arms adjacent said member, an arm pivoted on the bracket with its pivot arranged in transverse relation to the pivot of the bell-crank, a rod leading from the arm to the regulating mechanism which is normally under tension, a latch which engages the arm and normally holds the rod from moving but is released from said engagement by the actuating member under certain conditions, a link connecting the second arm of the bell-crank lever with the latch, there being a cam surface on the latch that is engaged by said pivoted arm when released from the latch to move the end of the bell-crank arm out of the path of said actuating member, and a spring which tends to keep the latch in engagement with the arm.

8. In an emergency governing device, the combination with a rotatable shaft, an actuating member mounted thereon, a bracket mounted adjacent the periphery of the member, a bell-crank lever pivoted on the bracket with the outer end of one of its arms adjacent said member, the axis of its pivot being parallel to the axis of the shaft, an arm pivoted at one end on the bracket with the axis of its pivot in a plane transverse to the axis of the shaft, a rod leading from the other end of the arm to the regulating mechanism, said rod being normally under tension, a pivotal connection between the rod and the end of the arm which is parallel to the pivot at the other end of said arm, a latch pivoted on the bracket which engages the arm and normally holds the rod from moving, a link connecting the second arm of the bell-crank lever with the latch, and a spring which tends to keep the latch in engagement with the arm.

9. In an emergency governing device, the combination of a rotatable shaft, an actuating member mounted thereon, a bracket mounted adjacent the periphery of the member, a bell-crank lever pivoted on the bracket with the outer end of one of its arms adjacent the member, the axis of its pivot being parallel to the axis of its shaft, an arm pivoted at one end on the bracket and extending parallel to the shaft with the axis of its pivot in a plane at right angles to the axis of the shaft, a rod leading from the other end of the arm to the regulating mechanism, said rod being normally under tension, a pivotal connection between the rod and the end of the arm which is parallel to the pivot at the other end of said arm, a latch which engages the arm intermediate its ends and holds the rod from moving, a pivot for the latch which is parallel to the bell-crank pivot, a link connecting the second arm of the bell-crank lever with the latch at a point intermediate the pivot and the outer end of said latch, and a spring connected at one end to the latch at a point on the opposite side of the pivot from the point of connection to the link, the other end of the spring being attached to the link adjacent the second arm of the bell-crank lever.

10. In an emergency governing device, the combination of a rotatable shaft, a bolt or stud passing diametrically through the shaft and provided with a shoulder adjacent one end, a nut on the other end of the stud that secures the bolt in the shaft by drawing said shoulder against the shaft, a block mounted for sliding movement on the nut, a second block mounted for sliding movement on the projecting portion of the stud beyond the shoulder, said blocks having different masses, two annular rings mounted on the opposite faces of the blocks and surrounding the shaft, said rings being normally concentric with the shaft, an abutment on the projecting portion of the stud, an abutment on the second block, and a spring arranged between the two abutments which opposes the movement of said rings and blocks along the stud.

In witness whereof, I have hereunto set my hand this 27th day of March, 1909.

FRED W. BENTLEY.

Witnesses:
BENJAMIN B. HULL,
HELEN ORFORD.